(12) United States Patent
Iwashita et al.

(10) Patent No.: US 7,690,474 B2
(45) Date of Patent: Apr. 6, 2010

(54) CLUTCH-MANIPULATION ASSIST DEVICE

(75) Inventors: Kanau Iwashita, Wako (JP); Yoshihisa Ieda, Wako (JP); Akihiko Tomoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 11/923,901

(22) Filed: Oct. 25, 2007

(65) Prior Publication Data
US 2008/0099297 A1    May 1, 2008

(30) Foreign Application Priority Data
Oct. 31, 2006    (JP)    ............... 2006-296452

(51) Int. Cl.
| B60K 17/02 | (2006.01) |
| F16D 25/08 | (2006.01) |
| F16D 23/12 | (2006.01) |
| B62D 61/02 | (2006.01) |
| B62K 11/00 | (2006.01) |
| B62M 7/06 | (2006.01) |

(52) U.S. Cl. .................. 180/374; 180/219; 192/85 CA; 192/91 A; 192/96

(58) Field of Classification Search ................. 180/219, 180/339, 374, 377, 383, 385, 908, 229; 192/85 CA, 192/91 A, 96
See application file for complete search history.

(56) References Cited

U.S. PATENT DOCUMENTS

| 4,632,206 | A | * | 12/1986 | Morinaka et al. | ............ 180/229 |
| 5,413,200 | A | * | 5/1995 | Hirata | ............ 192/40 |
| 5,495,928 | A | * | 3/1996 | Sando | ............ 192/89.29 |
| 2006/0169569 | A1 | * | 8/2006 | Ooishi et al. | ............ 192/99 S |
| 2006/0191766 | A1 | * | 8/2006 | Konukiyo et al. | ............ 192/86 |
| 2007/0205072 | A1 | * | 9/2007 | Villata et al. | ............ 192/85 C |

FOREIGN PATENT DOCUMENTS

JP    7-285482 A    10/1995

* cited by examiner

*Primary Examiner*—Ruth Ilan
*Assistant Examiner*—Keith Frisby
(74) *Attorney, Agent, or Firm*—Westerman, Hattori, Daniels & Adrian, LLP

(57) ABSTRACT

In a clutch manipulation assist device which includes a clutch assist actuator, the actuator is arranged at a position where it is possible to suppress the influence of heat from an engine on the actuator without requiring the heat insulation structure or the like. In a clutch manipulation assist device which includes a clutch mechanism 61 which is arranged in a power transmission path for transmitting a rotational driving force of an engine to a wheel, a clutch-manipulation mechanism in which a clutch manipulation force is inputted, and an actuator which generates a clutch assist force in response to a manipulation of the clutch manipulation mechanism, the actuator is arranged in front of the engine and outside a main frame.

3 Claims, 8 Drawing Sheets

FIG. 8
(a)
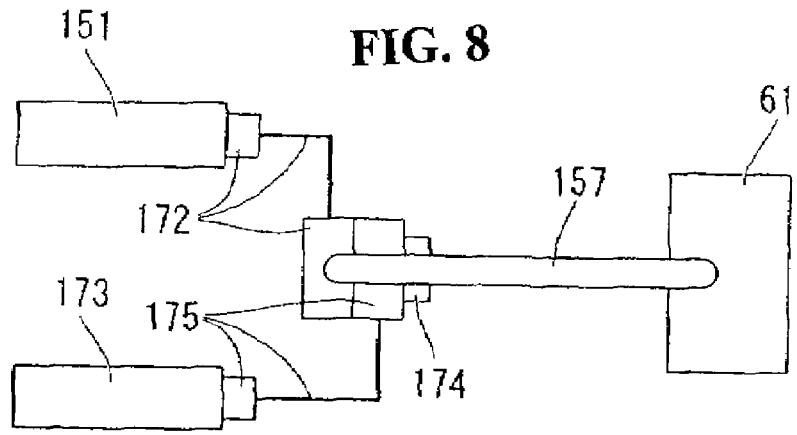
(b)
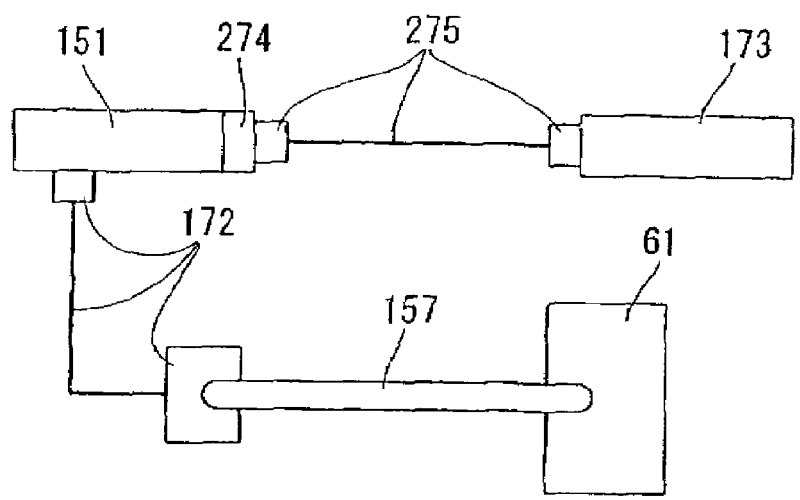
(c)
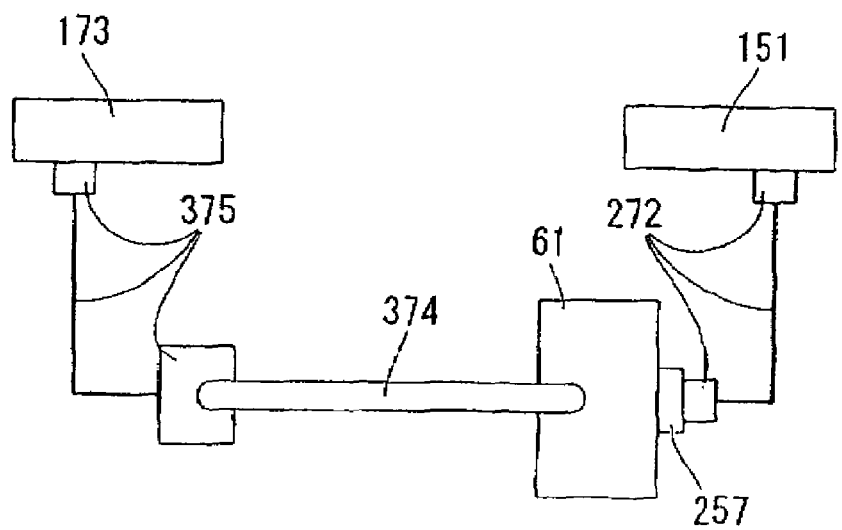

CLUTCH-MANIPULATION ASSIST DEVICE

BACKGROUND OF THE INVENTION

The present invention relates to a clutch-manipulation assist device which is preferably applicable to a motorcycle or the like.

Conventionally, for reducing a load of a clutch manipulation in a motorcycle of a large displacement particularly, there has been proposed a clutch-manipulation assist device which includes an actuator for assisting a clutch manipulation and assists the clutch manipulation using the actuator (for example, see JP-A-07-285482).

SUMMARY OF THE INVENTION

Here, in the above-mentioned conventional example of the clutch-manipulation assist device, the actuator is mounted on a vehicle body frame member which is positioned above an engine and inside a fuel tank and hence, the actuator is liable to be easily influenced by heat from the engine. Thus, it has been necessary to take the provision of a heat insulation structure for the actuator or the like (the enhancement of the heat resistance property of the actuator) into consideration.

Accordingly, it is an object of the invention to arrange, in a clutch-manipulation assist device which includes an actuator for assisting a clutch manipulation, the actuator at a position where it is possible to suppress the influence of heat from an engine on the actuator without requiring a heat insulation structure for the actuator or the like.

As means for overcoming the above-mentioned drawbacks, the invention is characterized in that, in a clutch-manipulation assist device which includes a clutch mechanism (for example, a clutch mechanism 61 in an embodiment) which is arranged in a power transmission path for transmitting a rotational driving force of an engine (for example, an engine 17 in the embodiment) to a wheel (for example, a rear wheel 15 in the embodiment) and engages/disengages the transmission of the rotational driving force of the engine to the wheel, a clutch-manipulation mechanism (for example, a clutch lever mechanism 51 in the embodiment) in which a clutch manipulation force is inputted, and an actuator (for example, an actuator 73 in the embodiment) which generates a clutch assist force in response to an operation of the clutch manipulation mechanism, the actuator is arranged in front of the engine and outside a main frame (for example, a main frame 8 in the embodiment).

Here, the main frame is a part which extends between a head pipe and a pivot of a vehicle body frame of a type selected from a group consisting of a backbone type, a cradle type, a twin spur type and the like.

The invention is further characterized in that the actuator is arranged more outside of the vehicle body than a front fork (for example, a front fork 3 in the embodiment).

The invention is further characterized in that the actuator is arranged inside a front cowl (for example, a front cowl 34 in the embodiment).

The invention is further characterized in that the actuator is mounted on a head pipe (for example, a head pipe 6 in the embodiment).

The invention is further characterized in that the clutch-manipulation assist device includes a follower mechanism (for example, a push rod 57 in the embodiment) which is interlocked with the actuator, and the actuator is arranged on the same side as an input portion (for example, a rod engaging portion 74 in the embodiment) of the follower mechanism from the actuator, with respect to a vehicle-body center line.

The invention is further characterized in that a transmission mechanism (for example, an assist force transmission mechanism 75 in the embodiment) which transmits the assist force generated by the actuator to the follower mechanism includes a master cylinder (for example, an assist master cylinder 71 in the embodiment) which generates a liquid pressure due to an operation of the actuator, a reservoir tank (for example, a reservoir tank 71a in the embodiment) for the master cylinder, and a slave cylinder (for example, an assist slave cylinder 76 in the embodiment) which operates the follower mechanism by receiving the liquid pressure from the master cylinder, a liquid pressure sensor (for example, a hydraulic pressure sensor S4 in the embodiment) is arranged in the liquid pressure path of the transmission mechanism, and the reservoir tank, the master cylinder, the liquid pressure sensor and the slave cylinder are arranged in order from top to bottom on the vehicle body.

According to the invention, by arranging the actuator in front of the engine and outside the main frame, it is possible to suppress the influence of heat from the engine on the actuator without requiring a heat insulation structure such as a heat insulating board for the actuator.

According to the invention, by arranging the actuator at a portion on which a traveling wind easily impinges while avoiding the front fork, it is possible to effectively cool the actuator.

According to the invention, it is possible to enhance the appearance of the vehicle body by suppressing an exposure of the actuator to the outside of the vehicle body and, at the same time, the actuator is covered with the front cowl. Hence, it is possible to effectively suppress scattering of pebbles or splashing of muddy water without separately providing a cover member for the actuator.

According to the invention, the actuator can be firmly supported using the head pipe having high rigidity. Further, the appearance of the vehicle body can be enhanced by suppressing the exposure of the actuator toward the outside of the vehicle body and, at the same time, it is not necessary to use a cover member for the actuator or the like.

According to the invention, it is possible to simplify the arrangement of the transmission mechanism (hydraulic type, cable type or the like) between the actuator and the follower mechanism.

According to the invention, the air bleeding property of the inside of the hydraulic path in a liquid-pressure type transmission mechanism between the actuator and the follower mechanism can be enhanced.

BRIEF DESCRIPTION OF THE DRAWINGS

FIG. 8(a) is a constitutional view corresponding to the above-mentioned embodiment, FIG. 8(b) is a constitutional view showing a modification of the above-mentioned embodiment, and FIG. 8(c) is a constitutional view showing another modification of the above-mentioned embodiment.

DETAILED DESCRIPTION OF THE INVENTION

Figure 1:
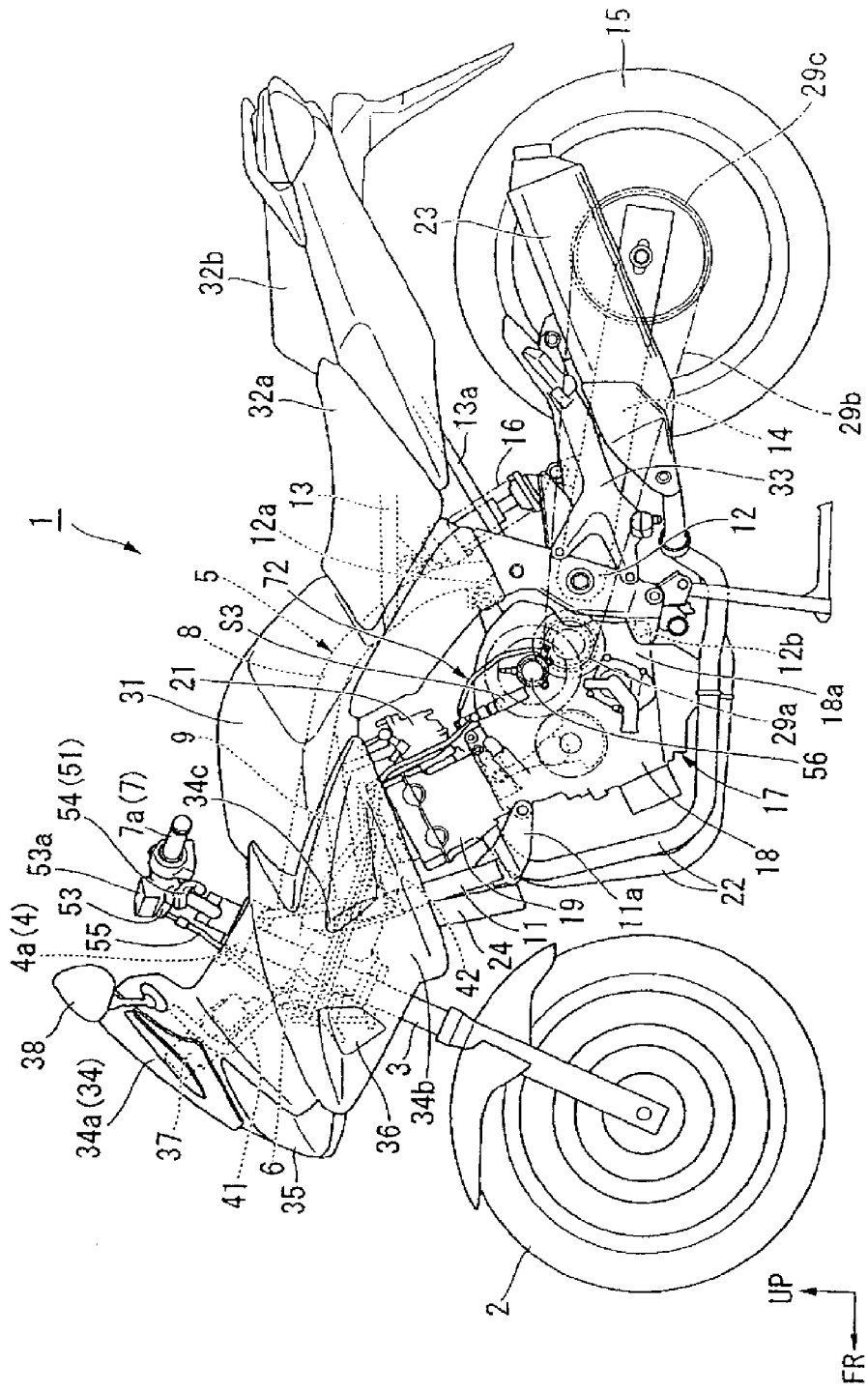
FIG. 1 is a left side view of a motorcycle in an embodiment of the invention.

Hereinafter, embodiments of the invention are explained in conjunction with drawings. Here, the directions of "front", "rear", "left" and "right" in the explanation made hereinafter are directions as viewed in the same directions of a vehicle unless otherwise specified. Further, in the drawing, an arrow FR indicates the vehicle frontward direction, an arrow LH indicates the vehicle leftward direction and an arrow UP indicates the vehicle upward direction respectively.

As shown in FIG. 1, a front wheel 2 of a motorcycle (saddle-type vehicle) 1 is pivotally supported on lower end portions of a pair of left and right front forks 3, and upper portions of the respective front forks 3 are pivotally supported on a head pipe 6 of a vehicle body frame 5 by way of a steering stem 4 in a steerable manner. A bar handle 7 is mounted on a top bridge 4a of the steering stem 4.

Figure 2:
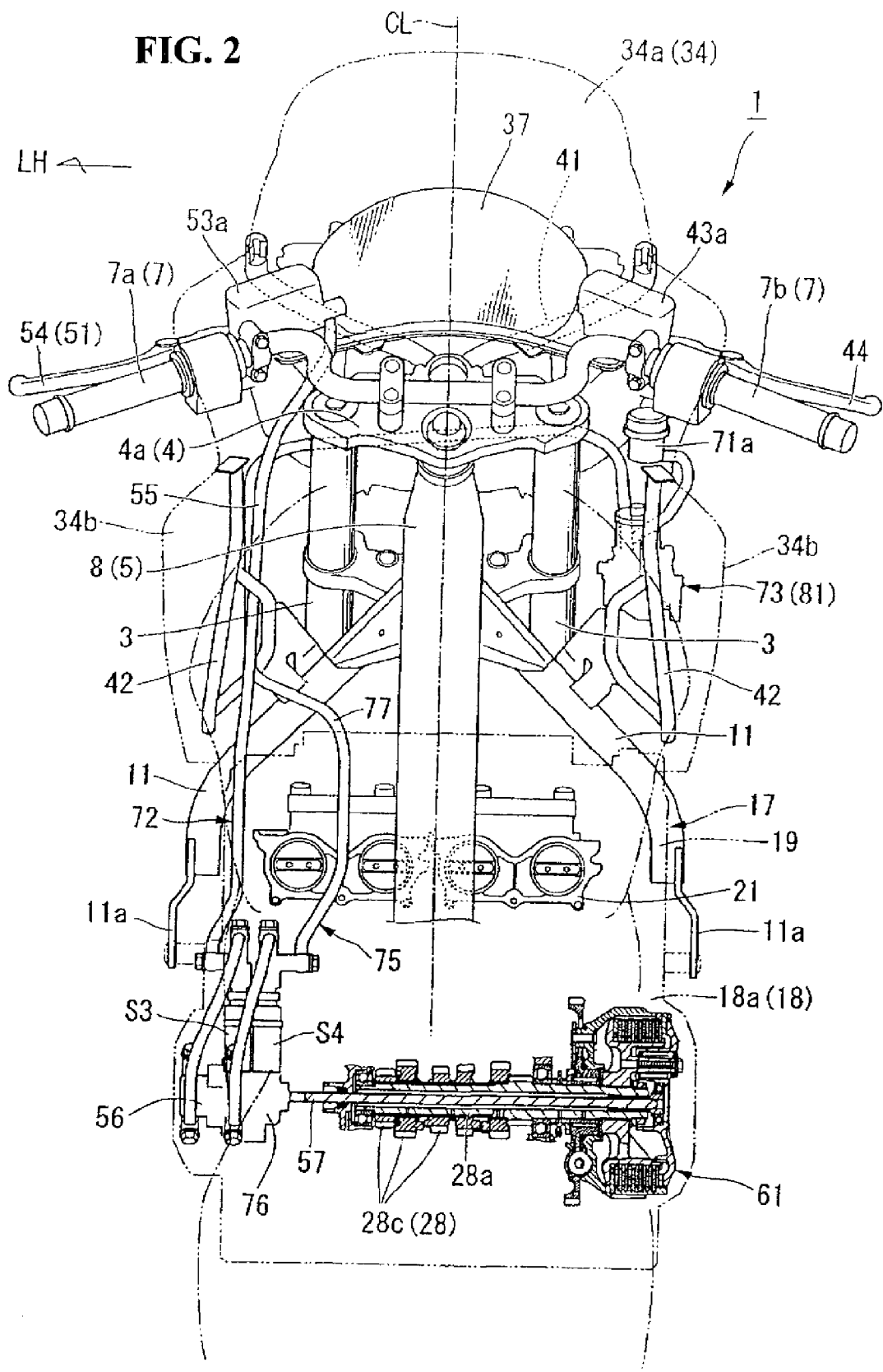
FIG. 2 is an explanatory view of the main constitution of the above-mentioned motorcycle as viewed from an oblique posterior upper angle.

To explain this embodiment also in conjunction with FIG. 2, the vehicle body frame 5 is of a so-called mono-backbone type in which the vehicle body frame 5 is mainly constituted of a main frame 8 which extends rearwardly from an upper portion of the head pipe 6 and, thereafter, extends downwardly in a curved shape. The main frame 8 is formed of a single rectangular steel pipe, and is arranged at the center in the vehicle width direction (lateral direction) in the same manner as the head pipe 6.

A gusset pipe 9 extends between a lower portion of the head pipe 6 and an intermediate portion of the main frame 8, and a pair of left and right engine hangers 11 extends downwardly from a front portion of the gusset pipe 9 in a spaced-apart manner from each other.

A pair of left and right pivot brackets 12 is mounted on a lower side of a rear portion of the main frame 8 and, at the same time, a seat rail 13 and a front end portion of a support pipe 13a for the seat rail 13 are mounted on an upper side of the rear portion of the main frame 8.

A front end portion of a swing arm 14 is pivotally supported on the respective pivot brackets 12 in a rockable manner, and a rear wheel 15 is pivotally supported on a rear end portion of the swing arm 14. A rear cushion 16 is arranged between a front portion of the swing arm 14 and a curved portion of the main frame 8.

On a lower portion of the main frame 8, an internal combustion engine, such as a parallel four-cylinder engine 17 having a crank axis along the vehicle width direction is mounted. A cylinder portion 19 which extends in the upper oblique frontward direction, is mounted on a crankcase 18 of the engine 17 in an erected manner. To a rear portion of the cylinder portion 19, throttle bodies 21 are connected for respective cylinders, while to a front portion of the cylinder portion 19, exhaust pipes 22 are connected for respective cylinders. The exhaust pipes 22 have portions thereof curved in front of the engine 17 and arrive at a position below the crankcase 18, and the exhaust pipes 22 are suitably collected and, thereafter, are distributed and connected to silencers 23 which are arranged on both sides of the vehicle-body rear portion. An engine cooling radiator 24 is arranged in front of the cylinder portion 19. An upper side of a front portion of the crankcase 18 is supported on the support plates 11a formed on lower portions of the respective engine hangers 11, and upper and lower sides of a rear portion of the crankcase 18 are respectively supported on upper and lower support portions 12a, 12b which are arranged in the vicinity of the pivot bracket 12.

Figure 3:
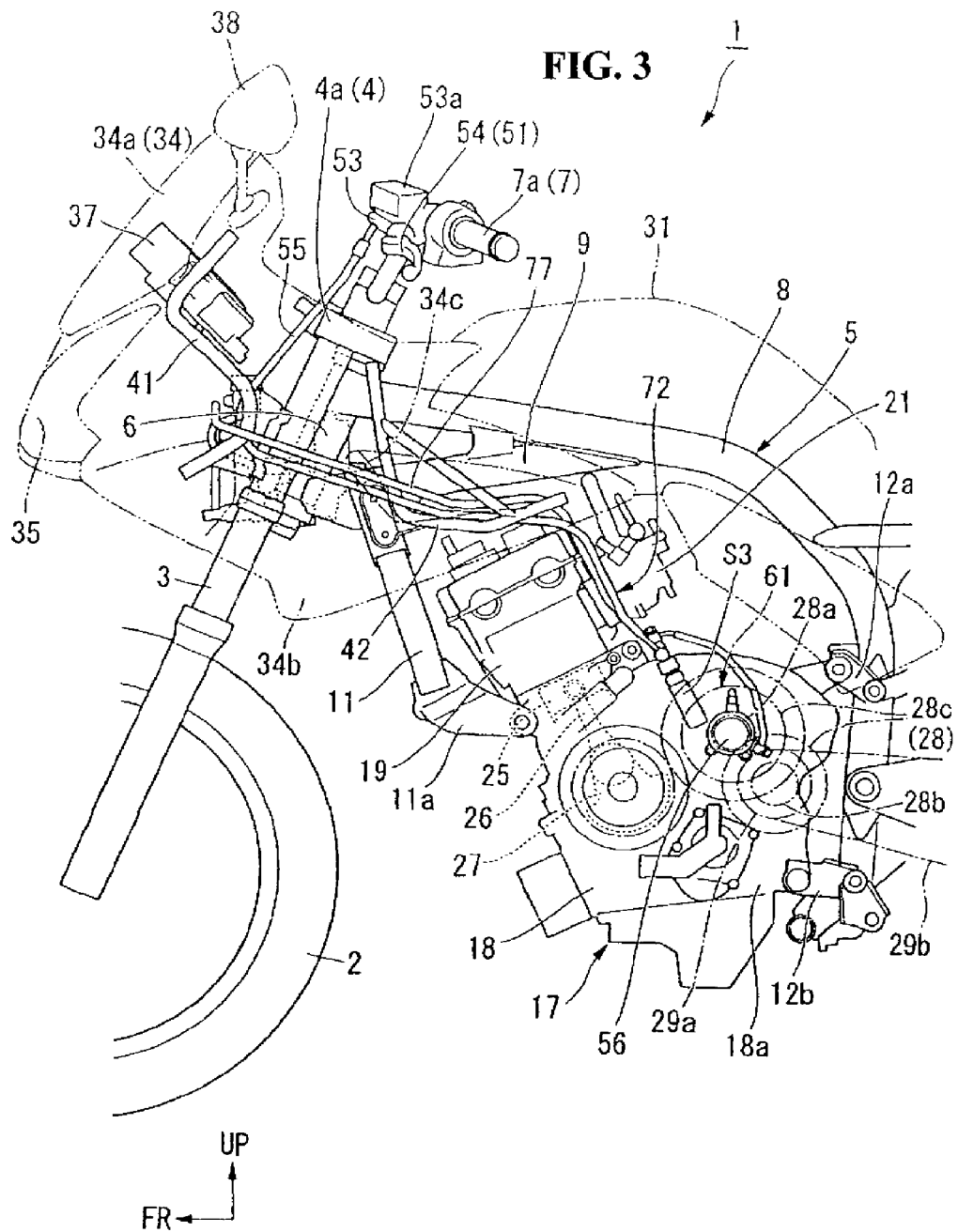
FIG. 3 is a left side view of the main constitution of the above-mentioned motorcycle.
Figure 4:
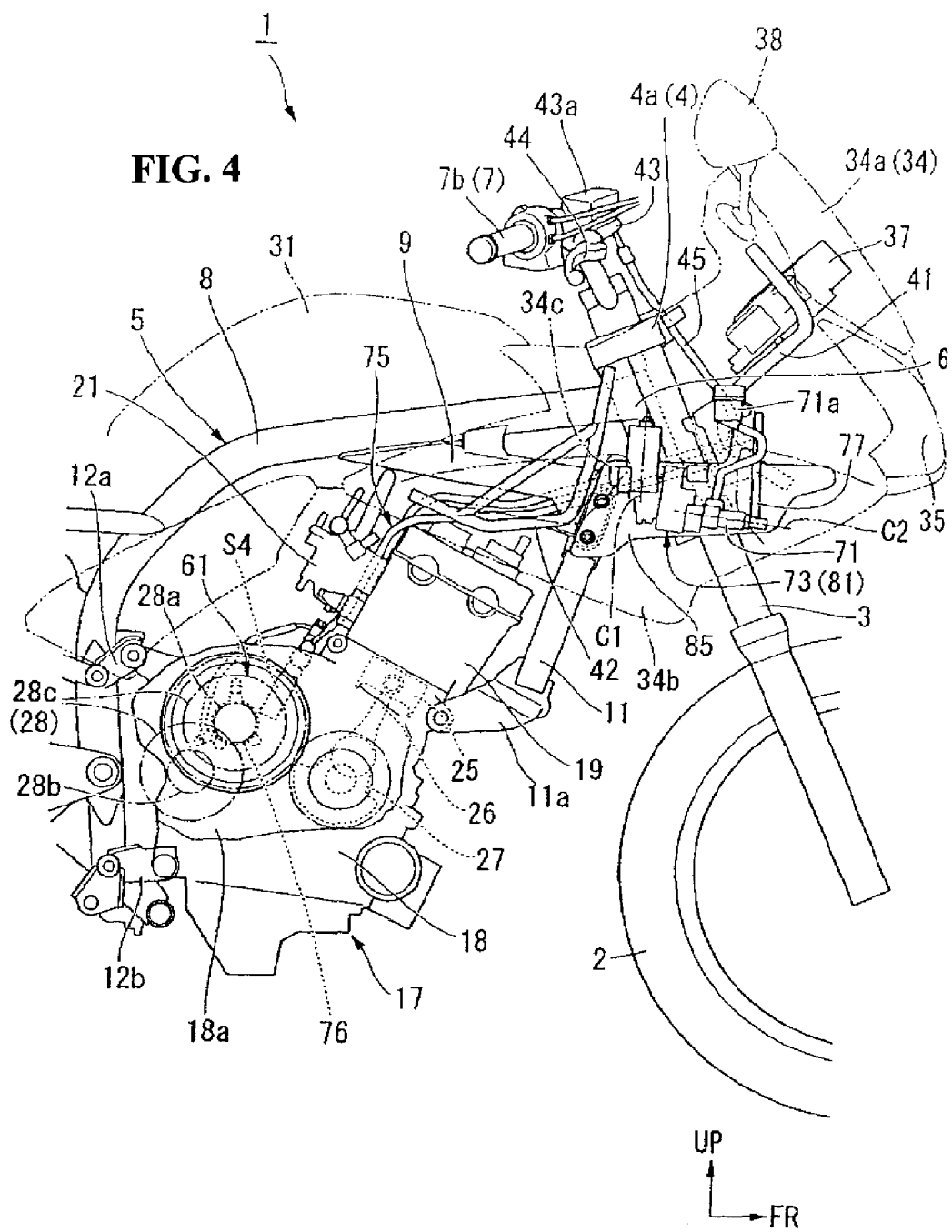
FIG. 4 is a right side view of the main constitution of the above-mentioned motorcycle

To explain this embodiment also in conjunction with FIG. 3 and FIG. 4, in the inside of the cylinder portion 19, pistons 25 which correspond to respective cylinders are fitted in a reciprocating manner, and the reciprocating motion of each piston 25 is converted into the rotary motion of a crankshaft 27 by way of a connecting rod 26. A rear portion of the crankcase 18 constitutes a transmission case 18a. In the inside of the transmission case 18a, a transmission 28 which is mainly constituted of a main shaft 28a, a counter shaft 28b and a speed-change gear train 28c, which strides over the main shaft 28a, and the counter shaft 28b is housed. A clutch mechanism 61 is stored in a right-side portion of the transmission case 18a. A rotational driving force of the crankshaft 27 is outputted to a drive sprocket wheel 29a arranged on a left side of the transmission case 18a by way of the clutch mechanism 61 and the transmission 28 and, thereafter, is transmitted to the rear wheel 15 by way of a drive chain 29b and a driven sprocket wheel 29c.

As shown in FIG. 1, a fuel tank 31 is arranged above the engine 17 in a state that the fuel tank 31 strides over the main frame 8. Behind the fuel tank 31, a rider's seat 32a which is supported on a front portion of the seat rail 13 is arranged. Behind the seat 32a, a pillion seat 32b which is supported on a rear portion of the seat rail 13 is arranged. On a rear portion of the pivot bracket 12, a front end portion of a step bracket 33 which supports a rider's step and a pillion's step in the longitudinal direction is mounted.

On a front portion of the vehicle body, a front cowl 34 which covers the surrounding of the head pipe 6 from a front side of the head pipe 6 to both sides of the head pipe 6 is arranged. The front cowl 34 is made of a synthetic resin, and has a front upper portion thereof formed into a frontwardly-downwardly-inclined nose shape and, at the same time, has a vehicle-width-direction inner side of the front upper portion formed into a screen 34a made of a semitransparent resin and extended in the upward direction.

A lower portion of the front cowl 34 is branched in left and right sides and covers vehicle-width-direction outer sides of the respective front forks 3 with a predetermined gap formed therebetween and, further extends rearwardly so as to cover both sides of a front portion of the fuel tank 31. Hereinafter, a lower portion of the front cowl 34 may also be referred to as left and right side cover portions 34b.

A left-and-right two-lamp-type head lamp 35 is arranged on a front end portion of the front cowl 34. On front portions of the respective side cover portions 34b, left and right front blinkers 36 are respectively arranged. A meter unit 37 is arranged on an upper inner side of the front cowl 34. On portions of the respective side cover portions 34b arranged behind the front blinkers 36, ducts 34c which discharge air in the inside of the cowl are formed. On both sides of an upper portion of the front cowl 34, left and right back mirrors 38 are mounted.

To explain the embodiment also in conjunction with FIG. 2 to FIG. 4, the front cowl 34 has a front portion thereof supported on the head pipe 6 by way of a cowl frame 41 together with the head lamp 35, the front blinkers 36, the back mirrors 38 and the meter unit 37 and, at the same time, has both left and right side portions (side cover portions 34b) thereof supported on the left and right engine hangers 11 by way of left and right cowl side frames 42.

The cowl frame 41 has a rear end portion (proximal end portion) thereof integrally fixed to a lower side of a front portion of the head pipe 6 using bolts or the like. The cowl frame 41 extends frontwardly from the head pipe 6 and, thereafter, is bifurcated into left and right sides and suitably supports a front inner portion of the front cowl 34, the head lamps 35, the front blinkers 36, the back mirrors 38 and the meter unit 37.

On the other hand, the cowl side frames 42 have intermediate portions (proximal portions) thereof integrally fixed to upper outer portions of the engine hangers 11 using the bolts or the like, and extend from the upper portions of the engine hangers 11 in the upward and rearward direction, thus forming support portions which support inner portions of the side cover portions 34b.

At a position arranged behind an upper portion of the front cowl 34 and above the side cover portions 34b and the fuel tank 31, left and right grip portions 7a, 7b of the bar handle 7 are arranged.

On a directly left side (vehicle-width-direction inner side) of the right grip portion 7b, a lever-holder-integral-type front brake master cylinder 43 is mounted, and a brake lever 44 for operating the front brake master cylinder 43 extends to a front side of the right grip portion 7b. By manipulating the brake lever 44, the hydraulic pressure (liquid pressure) is generated in the inside of the front brake master cylinder 43 and the hydraulic pressure is suitably transmitted to front and rear brake calipers (not shown in the drawing), which constitute slave cylinders by way of a hydraulic pressure pipe (a hose, a pipe or a combination of the hose and the pipe) 45 or the like.

On the other hand, on a directly right side (vehicle-width-direction inner side) of the left grip portion 7a, a Lever-holder-integral-type clutch master cylinder 53 is mounted, and a clutch lever 54 for operating the clutch master cylinder 53 extends to a front side of the left grip portion 7a. A hydraulic pressure (liquid pressure) which is generated in the inside of the clutch master cylinder 53 due to the manipulation of the clutch lever 54 is transmitted to the slave cylinder 56 which is mounted on a left outer side of the transmission case 18a by way of a hydraulic pressure pipe (a hose, a pipe or a combination of the pipe and the hose) 55. The hydraulic pressure which is transmitted to the slave cylinder 56 shifts the multi-disc-type clutch mechanism 61 to a clutch disengagement side by way of the push rod 57. Here, although reservoir tanks 43a, 53a are respectively integrally mounted on the respective master cylinders 43, 53, these reservoir tanks 43a, 53a may be arranged separately from the respective master cylinders 43, 53.

Figure 5:
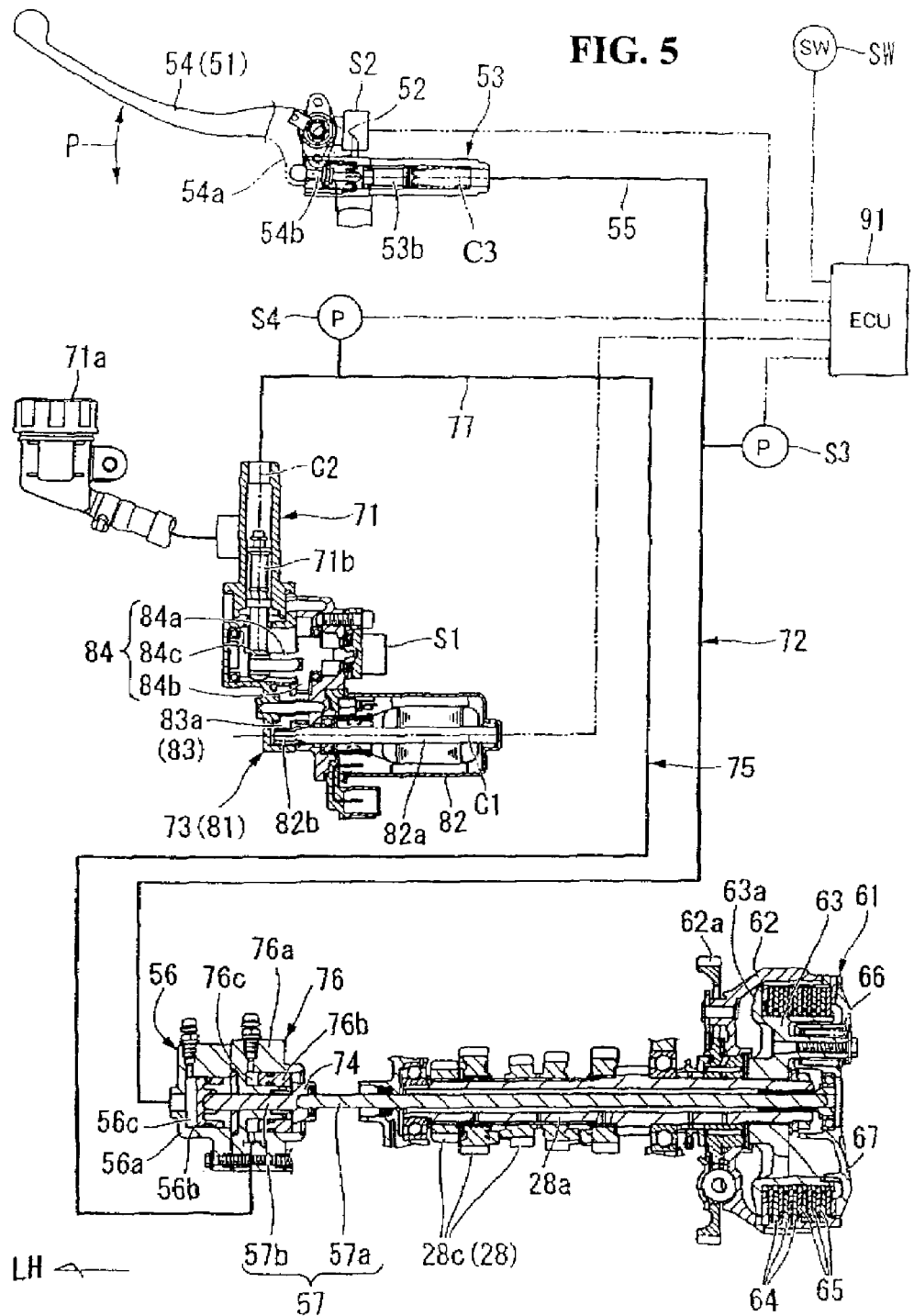
FIG. 5 is a constitutional view of a clutch assist system of the above-mentioned motorcycle.

To explain the embodiment also in conjunction with FIG. 5, the clutch mechanism 61 is arranged coaxially at a right end portion of the main shaft 28a along the lateral direction in the transmission 28. The clutch mechanism 61 includes a cup-shaped clutch outer 62 which opens rightwardly (vehicle-width-direction outer side) and is relatively rotatably supported on the main shaft 28a, a clutch center 63 which is arranged in the inside of the clutch outer 62 and is relatively non-rotatably supported on the main shaft 28a, a plurality of clutch discs 64 which is relatively non-rotatably supported on an inner periphery of the clutch outer 62 and overlaps each other in the clutch axial direction, a plurality of clutch plates 65 which is relatively non-rotatably supported on an outer periphery of the clutch center 63 and overlaps alternately with the respective clutch discs 64 in the clutch axial direction, and a pressure plate 67 which is biased toward a side close to the clutch center 63 (left side) with respect to the clutch center 63 due to a spring force of a plurality of clutch springs (coil springs) 66.

In the clutch mechanism 61, when the clutch lever 54 is not manipulated so that the hydraulic pressure is not supplied to the slave cylinder 56, the pressure plate 67 is biased to a side close to the clutch center 63 (clutch engagement side) due to a spring force of the respective clutch springs 66. Accordingly, the respective clutch discs 64 and the respective clutch plates 65 are clamped in a stacked state by the pressure plate 67 and the flange portion 63a of the clutch center 63 thus bringing these discs 64 and plates 65 into a friction engagement. In such a state, when a rotational driving force of the crank shaft 27 is inputted to a primary driven gear 62a mounted on a bottom portion of the clutch outer 62, the driving force is transmitted to the main shaft 28a by way of the clutch mechanism 61 and, at the same time, the driving force is transmitted to the counter shaft 28b by way of a speed-change gear train 28c and, thereafter, is transmitted to the rear wheel 15 by way of a chain-type power transmission mechanism.

On the other hand, when the clutch lever 54 is manipulated so that the hydraulic pressure is supplied to the slave cylinder 56, the pressure plate 67 is displaced to a side separated from the clutch center 63 (clutch disengagement side) against the biasing force of the respective clutch springs 66 by way of the push rod 57 and hence, the friction engagement between the respective clutch discs 64 and the respective clutch plates 65 is released. In such a state, when the rotational driving force of the crank shaft 27 is inputted to the clutch outer 62, the driving force is cut off by the clutch mechanism 61 and hence, the driving force is not transmitted to the main shaft 28a and parts succeeding the main shaft 28a.

Here, the motorcycle 1 includes, for reducing the clutch manipulation force applied to the clutch lever 54 which constitutes an operation element of the clutch mechanism 61 (clutch manipulation member), a clutch assist system which applies the hydraulic pressure from the assist master cylinder 71 to the clutch mechanism 61 (push rod 57) in addition to the hydraulic pressure from the clutch master cylinder 53 corresponding to a stroke quantity of the clutch lever 54.

As shown in FIG. 5, the clutch assist system includes a clutch lever mechanism (clutch manipulation mechanism) 51 to which a clutch manipulation force is inputted, the push rod 57 (follower mechanism, release mechanism) which operates the clutch mechanism 61 in an interlocking manner with the clutch lever mechanism 51, a hydraulic manipulation force transmission mechanism 72 which transmits a clutch manipulation force inputted to the clutch lever mechanism 51 to the push rod 57, an electrically-operated actuator 73 which generates a clutch assist force, a rod engaging portion 74 (assist follower mechanism) which imparts a clutch assist force to the push rod 57 in an interlocking manner with the actuator 73, a hydraulic assist force transmission mechanism 75 which transmits the clutch assist force generated by the actuator 73 to the rod engaging portion 74, and an ECU (electronic control unit) 91 which performs an operation control of the actuator 73.

The manipulation force transmission mechanism 72 includes the above-mentioned clutch master cylinder 53, the above-mentioned slave cylinder 56 and an hydraulic pressure pipe 55 which connects these cylinders 53, 56. The assist force transmission mechanism 75 includes an assist master cylinder 71 which is contiguously formed on the actuator 73, an assist slave cylinder 76 which is contiguously formed on the slave cylinder 56, and an assist hydraulic pressure pipe (a hose, a pipe or the combination of the hose and the pipe) 77 which connects these cylinders 71, 76.

The assist master cylinder 71 is integrally formed on the actuator 73 and constitutes an actuator unit 81. To the assist master cylinder 71, a separate reservoir tank 71a is connected by way of a hose or the like. The reservoir tank 71a is also integrally mounted on the actuator unit 81 as a portion of the actuator unit 81. Here, the reservoir tank 71a may be integrally formed on the assist master cylinder 71.

The actuator 73 is configured such that a speed reduction gear mechanism 83 and a cam mechanism 84 are contiguously mounted on an electrically-operated motor 82 which constitutes a driving source. A drive shaft 82a of the electrically-operated motor 82 faces the inside of a housing of the speed reduction gear mechanism 83, and a drive gear 82b formed on an outer periphery of the drive shaft 82a meshes with a driven gear 84b formed on one side of a cam shaft portion 84a of the cam mechanism 84 by way of a relay gear 83a of the speed reduction gear mechanism 83. Rotary axes of the relay gear 83a and the cam shaft portion 84a are arranged parallel to a rotary axis C1 of the drive shaft 82a of the electrically-operated motor 82.

The assist master cylinder 71 is integrally and contiguously formed on the cam mechanism 84. The assist master cylinder 71 is arranged such that a reciprocating axis C2 of the piston 71b of the assist master cylinder 71 is orthogonal to the rotary axis C1 of the electrically-operated motor 82. An eccentric portion 84c of the cam shaft portion 84a is brought into contact with a proximal end portion of the piston 71b of the assist master cylinder 71, and when the electrically-operated motor 82 is driven due to a control of the ECU 91, the piston 71b is pushed corresponding to a rotational quantity of the electrically-operated motor 82, thus generating the hydraulic pressure in the inside of the assist master cylinder 71. When the hydraulic pressure is supplied to the assist slave cylinder 76 by way of the assist hydraulic pressure pipe 77, a predetermined clutch assist force is imparted to the push rod 57 by way of a rod engaging portion 74. Here, in the drawing, symbol S1 indicates a rotary angle sensor which is arranged on one side of the cam shaft portion 84a and detects a rotary angle of the cam shaft portion 84a as an operation quantity of the actuator 73.

The clutch lever mechanism 51 includes the above-mentioned clutch lever 54 and a lever holder 52 which rotatably supports a proximal portion of the clutch lever 54. A clutch master cylinder 53 which is contiguously formed with the lever holder 52 is arranged such that a reciprocating axis C3 of a piston 53b of the clutch master cylinder 53 becomes substantially orthogonal to the stroke direction (rotational direction indicated by an arrow P in the drawing) of the clutch lever 54.

An input portion 54a which faces the reciprocating axis C3 of the piston 53b of the clutch master cylinder 53 is formed on the proximal portion of the clutch lever 54. The input portion 54a pushes a proximal end portion of the piston 53b by way of a relay rod 54b so as to generate a hydraulic pressure corresponding to a stroke quantity of the clutch lever 54 in the inside of the clutch master cylinder 53. By supplying the hydraulic pressure to a slave cylinder 56 by way of a hydraulic pipe 55, a predetermined clutch manipulation force is imparted to a clutch mechanism 61 by way of a push rod 57. Here, a stroke sensor S2 which detects the stroke quantity (manipulation quantity) of the clutch lever 54 is integrally mounted on the lever holder 52.

The push rod 57 is slidably inserted into the inside of a hole which penetrates a main shaft 28a along an axis of the main shaft 28a, wherein a right end portion of the push rod 57 engages a center portion of a left side (vehicle-width-direction inner side) of a pressure plate 67 of the clutch mechanism 61, and a left side portion of the push rod 57 is made to face the inside of the respective slave cylinders 56, 76.

The respective slave cylinders 56, 76 coaxially overlap each other in a state that the slave cylinder 56 is arranged on a left side (vehicle-width-direction outer side) and the assist slave cylinder 76 is arranged on a right side (vehicle-width-direction inner side). Further, the respective slave cylinders 56, 76 are coaxially arranged with the main shaft 28a on a left outer side of the transmission case 18a.

The slave cylinder 56 defines a hydraulic chamber 56c in the inside of a cup-shaped housing 56a which opens rightwardly together with a piston 56b. A left end portion of the push rod 57 engages a center portion of a right side (vehicle-width-direction inner side) of the piston 56b. By supplying the hydraulic pressure to the hydraulic chamber 56c, the piston 56b is moved rightwardly and pushes the push rod 57 rightwardly thus generating the stroke of the push rod 57.

On the other hand, the assist slave cylinder 76 defines an annular assist hydraulic chamber 76c in the inside of a housing 76a which allows the push rod 57 to pass therethrough together with an annular piston 76b. A right end portion of the piston 76b is brought into contact with a left end portion of a flange-like rod engaging portion 74 which is integrally formed on an outer periphery of an intermediate portion of the push rod 57. By supplying the hydraulic pressure to the assist hydraulic chamber 76c, the piston 76b is moved rightwardly and pushes the push rod 57 rightwardly thus generating the stroke of the push rod 57.

Here, the push rod 57 is constituted in a split manner, that is, the push rod 57 is constituted of an elongated rod body 57a which passes through the inside of the main shaft 28a from the pressure plate 67 of the clutch mechanism 61 and reaches a position in the vicinity of the assist slave cylinder 76, and a relatively short separate rod 57b which engages a left end portion of the rod body 57a. The separate rod 57b passes through the assist slave cylinder 76 and faces the inside of the slave cylinder 56, and a left end portion of the separate rod 57b engages a center portion of a right side (vehicle-width-direction inner side) of the piston 56b. The above-mentioned rod engaging portion 74 is integrally formed on a right end portion of the separate rod 57b.

The ECU 91 operates the actuator 73 so as to generate an optimum clutch assist force (hydraulic pressure) based on detection signals from hydraulic pressure sensors S3, S4, the above-mentioned stroke sensor S2, the above-mentioned rotational angle sensor S1 and the like which respectively detect hydraulic pressures in the inside of the respective hydraulic pipes 55, 77 (supply hydraulic pressures from respective master cylinders 53, 71). Here, in the drawing, symbol SW indicates a switch which changes over ON/OFF states of a clutch assist control.

Then, when the clutch manipulation force is inputted to the clutch lever 54 with the clutch assist control in an ON state, the hydraulic pressure attributed to the stroke of the clutch lever 54 is transmitted to the slave cylinder 56 from the clutch master cylinder 53. Accordingly, the pressure plate 67 of the clutch mechanism 61 is displaced to the clutch disengagement side by way of the push rod 57 by a quantity corresponding to the stroke quantity of the clutch lever 54 and, at the same time, in response to a detection signal from the above-mentioned stroke sensor S2 or the like, the ECU 91 operates the actuator 73 so as to transmit the assist hydraulic pressure corresponding to the stroke quantity of the clutch lever 54 to the assist slave cylinder 76 from the assist master cylinder 71 thus imparting the predetermined clutch assist force to the push rod 57.

Due to such an operation, the clutch manipulation force for the clutch lever 54 can be reduced and, at the same time, it is possible to perform a control for maintaining the clutch manipulation force at a fixed value over the whole stroke region of the clutch lever 54 or the like. Further, by comparing the output hydraulic pressure and the input hydraulic pressure based on the detection signals from the respective hydraulic pressure sensors S3, S4, it is possible to perform a control which can obtain the optimum assist force, a trouble diagnosis or the like.

Here, when the clutch assist control is in an OFF state, in a state that the engine is stopped or in a state that the ignition is turned off, the clutch assist force is not generated at the time of performing the stroke of the push rod 57. Here, the rod engaging portion 74 of the push rod 57 is only separated from the piston 76b of the assist slave cylinder 76 and does not influence the stroke of the push rod 57.

As shown in FIG. 2 and FIG. 4, the actuator unit 81 is positioned on a right side below the head pipe 6 and inside (on the left side of, on the vehicle-width-direction inner side of) the right side cover portion 34b of the front cowl 34. A rotary axis C1 of an electrically-operated motor 82 is arranged substantially vertically and, at the same time, the assist master cylinder 71 is positioned on a front side, and a reciprocation axis C2 of the piston 71b of the assist master cylinder 71 is arranged substantially in the longitudinal direction. Due to such an arrangement, the actuator unit 81 is not exposed to the outside of the vehicle body, and the actuator unit 81 becomes inconspicuous as viewed from a position above the head pipe 6 and, at the same time, a size of the actuator unit 81 in the vehicle width direction can be suppressed thus enhancing the layout property of the actuator unit 81 in the inside of the front cowl 34.

Further, the actuator unit 81 is positioned on a right side (vehicle-width-direction outer side) of the main frame 8 and the right front fork 3 and, at the same time, is positioned approximately on a left side (vehicle-width-direction inner side) of a right end position of the cylinder portion 19 of the engine 17. Here, the actuator unit 81 is positioned on a side opposite to the assist slave cylinder 76 and an input portion (rod engaging portion 74) to the push rod 57 with a vehicle body center line CL sandwiched therebetween.

Further, the actuator unit 81 is arranged in front of a front-end position (cylinder front end) of the engine 17 as viewed from a side of the vehicle body.

The actuator unit 81 is supported on the vehicle body frame 5 by way of a steel-sheet-made support plate 85, for example. The support plate 85 is formed in a plate shape substantially orthogonal to the vehicle width direction, for example, wherein the support plate 85 has a rear end portion thereof fixed to an upper portion of the right engine hanger 11 together with a proximal portion of the right cowl side frame 42, and a front end portion thereof fixed to an arbitrary fixing portion on a right side of a cowl frame 41. A reservoir tank 71a is supported on an upper portion of the support plate 85. In a state that the actuator unit 81 is supported on the support plate 85, the reservoir tank 71a is positioned above the assist master cylinder 71 and in front of and above the electrically-operated motor 82.

One end portion of the assist hydraulic pipe 77 is connected to a front end portion of the assist master cylinder 71. To explain this embodiment also in conjunction with FIG. 3, the assist hydraulic pipe 77 extends from a front end portion of the assist master cylinder 71 toward a left side in a traversing manner in front of the head pipe 6 and, thereafter, extends obliquely in the downward and rearward direction together with the hydraulic pipe 55 which extends from the clutch master cylinder 53. Further, the assist hydraulic pipe 77 and the hydraulic pipe 55 extend along an upper portion and a rear portion on a left side of the cylinder portion 19 and, thereafter, are respectively connected to ports of the respective corresponding slave cylinders 56, 76. Here, while the hydraulic pipe 55 passes the vehicle-width-direction outer side of the throttle body 21 at the left end, the assist hydraulic pipe 77 is changed toward the vehicle-width-direction inner side above the cylinder portion 19 corresponding to the assist slave cylinder 76 positioned on the vehicle-width-direction inner side, and is pulled around to pass between the respective throttle bodies 21 of the left two cylinders.

On a left upper portion of the transmission case 18a, the above-mentioned respective hydraulic pressure sensors S3, S4 which detect the hydraulic pressures in the inside of the respective hydraulic pipes 55, 77 are arranged. The respective hydraulic pressure sensors S3, S4 are arranged substantially parallel to the cylinder portion 19 and are formed in a rod shape as viewed in a side view, and are connected to the hydraulic pipes 55, 77 which correspond to upper end portions of the hydraulic pressure sensors S3, S4. Here, each hydraulic pipe 55, 77 is divided into a master cylinder side and a slave cylinder side using the hydraulic pressure sensor S3, S4 as a boundary. The respective hydraulic pressure sensors S3, S4 correspond to the arrangement of the respective slave cylinders 56, 76, and are arranged in parallel to each other in a state that the hydraulic pressure sensor on the hydraulic path of the manipulation force transmission mechanism 72 is referred to as the hydraulic pressure sensor on the vehicle-width-direction outer side and the hydraulic pressure sensor on the hydraulic path of the assist force transmission mechanism 75 is referred to as the hydraulic pressure sensor on the vehicle-width-direction inner side.

Further, in a state that the manipulation force transmission mechanism 72 is mounted on the vehicle body, the reservoir tank 53a, the master cylinder 53, the hydraulic pressure sensor S3 and the slave cylinder 56 are arranged in order from top to bottom on the vehicle body. In the same manner, in a state that the assist force transmission mechanism 75 is mounted on the vehicle body, the reservoir tank 71a, the assist master cylinder 71, the hydraulic pressure sensor S4, the assist slave cylinder 76 are arranged in order from top to bottom on the vehicle body. Due to such an arrangement, it is possible to facilitate bleeding of air in the inside of the hydraulic paths in the respective hydraulic transmission mechanisms 72, 75.

As has been explained heretofore, the clutch-manipulation assist device according to the above-mentioned embodiment includes the clutch mechanism 61 which is arranged in the power transmission path for transmitting the rotational driving force of the engine 17 to the rear wheel 15 and engages/disengages the transmission of the rotational driving force of the engine 17 to the rear wheel 15, the clutch lever mechanism 51 in which the clutch manipulation force is inputted, and the actuator 73 which generates the clutch assist force in response to the operation of the clutch lever mechanism 51, wherein the actuator 73 is arranged in front of the engine 17 and outside the main frame 8. Due to such a constitution, it is possible to suppress the influence of heat from the engine on the actuator 73 without requiring the heat insulation structure such as a heat insulating board for the actuator 73.

Further, in the above-mentioned clutch-manipulation assist device, the actuator 73 is arranged more outside in the vehicle width direction than the front fork 3 and hence, the actuator 73 is arranged at the portion on which a traveling wind easily impinges while avoiding the front fork 3 whereby it is possible to effectively cool the actuator 73.

Further, in the above-mentioned clutch-manipulation assist device, by arranging the actuator 73 inside the front cowl 34, it is possible to enhance the appearance of the vehicle body by suppressing the exposure of the actuator 73 to the outside of the vehicle body and, at the same time, the actuator 73 is covered with the front cowl 34 and hence, it is possible to effectively suppress scattering of pebbles or splashing of muddy water or the like without separately providing a cover member for the actuator 73.

Further, in the above-mentioned clutch-manipulation assist device, the assist force transmission mechanism 75 which transmits the assist force generated by the actuator 73 to the push rod 57 includes the assist master cylinder 71 which generates the hydraulic pressure due to the operation of the actuator 73, the reservoir tank 71a for the assist master cylinder 71, and the assist slave cylinder 76 which operates the push rod 57 by receiving the hydraulic pressure from the assist master cylinder 71, wherein the hydraulic pressure sensor S4 is arranged in the hydraulic path of the assist force transmission mechanism 75, and the reservoir tank 71a, the assist master cylinder 71, the hydraulic pressure sensor S4 and the assist slave cylinder 76 are arranged in order from top to bottom on the vehicle body. Due to such a constitution, the air bleeding property of the inside of the hydraulic path in the assist force transmission mechanism 75 between the actuator 73 and the push rod 57 can be enhanced.

Figure 6:
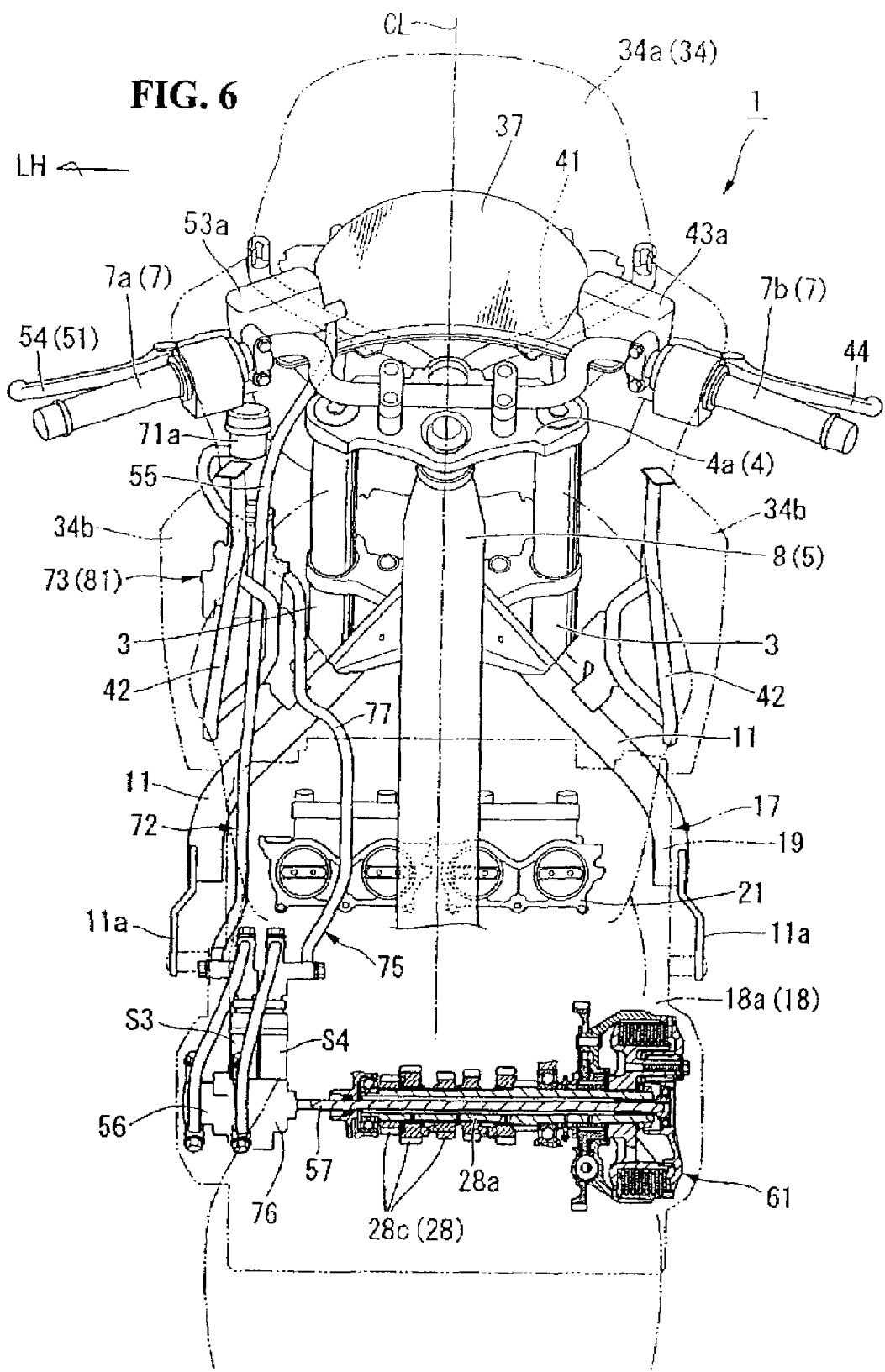
FIG. 6 is an explanatory view corresponding to FIG. 2 showing a modification of the above-mentioned embodiment.

Here, the invention is not limited to the above-mentioned embodiment. For example, as shown in FIG. 6, the actuator 73 may be arranged on the same side as the input portion (rod engaging portion 74) of the push rod 57 from the actuator 73 with respect to the vehicle body center line CL. In this case, the arrangement of the assist force transmission mechanism 75 between the actuator 73 and the push rod 57 can be simplified.

Figure 7:
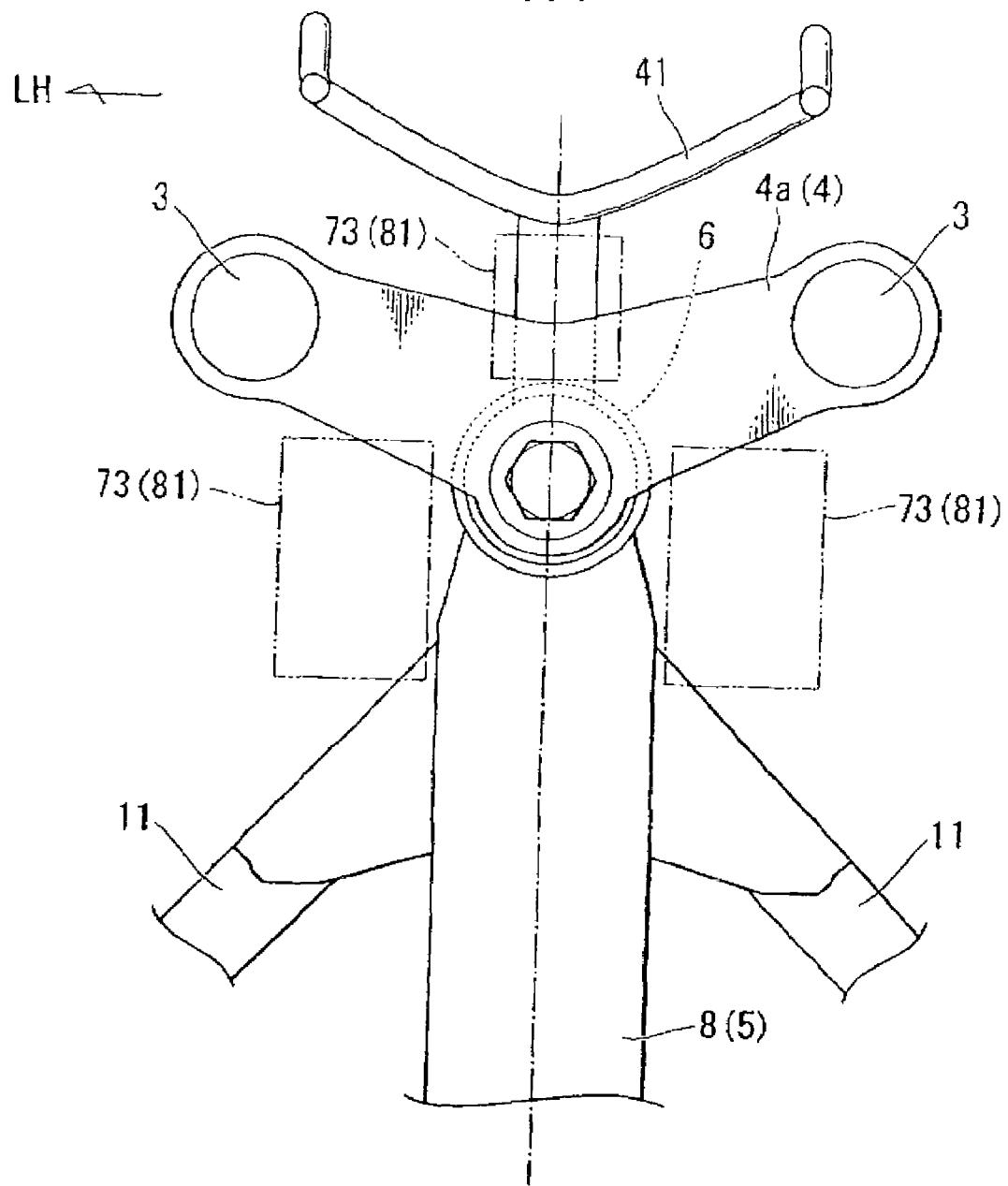
FIG. 7 is an explanatory view corresponding to a portion of FIG. 2 showing another modification of the above-mentioned embodiment.

Further, as shown in FIG. 7, the above-mentioned actuator 73 (actuator unit 81) may be mounted on the head pipe 6. In this case, by directly mounting the actuator 73 on the head pipe 6 or by mounting the actuator 73 on a proximal end portion of the cowl frame 41 which is mounted on the head pipe 6 or the like, the actuator 73 can be firmly supported in the periphery of the head pipe 6 having high rigidity.

Here, the transmission mechanism between the clutch manipulation mechanism or the actuator and the corresponding follower mechanism (push rod or the like) is not limited to the hydraulic pressure type (liquid pressure type) and may be of a cable type or the combination of these types.

Further, the follower mechanism which is interlocked with the clutch manipulation mechanism or the actuator is not limited to the push rod type and may be of a rack and pinion type, a cam type, or a ball screw type or the combination of these types.

Here, FIG. 8(a) is a view showing the constitution similar to the constitution of the above-mentioned embodiment, wherein the clutch-manipulation assist device includes a clutch manipulation mechanism 151 having a clutch lever or the like to which a clutch manipulation force is inputted, a follower mechanism 157 such as a push rod which operates a clutch mechanism 61 in an interlocking manner with the clutch manipulation mechanism 151, a hydraulic manipulation force transmission mechanism 172 which transmits a clutch manipulation force inputted to the clutch manipulation mechanism 151 to the follower mechanism 157, for example, an electrically-operated actuator 173 which generates a clutch assist force, an assist follower mechanism 174 which imparts a clutch assist force to the follower mechanism 157 in an interlocking manner with the actuator 173, and a hydraulic assist force transmission mechanism 175 which transmits the clutch assist force generated by the actuator 173 to the assist follower mechanism 174.

Further, FIG. 8(b) is a view showing a modification of the above-mentioned embodiment, wherein the clutch-manipulation assist device includes the clutch manipulation mechanism 151, the follower mechanism 157, the manipulation force transmission mechanism 172 and the actuator 173 in the same manner as the above-mentioned embodiment. Further, the clutch-manipulation assist device also includes an assist follower mechanism 274 which imparts a clutch assist force to the clutch manipulation mechanism 151 in an interlocking manner with the actuator 173 and a hydraulic-type or cable-type assist force transmission mechanism 275 which transmits a clutch assist force from the actuator 173 to an assist follower mechanism 274.

Further, FIG. 8(c) is a view showing another modification of the above-mentioned embodiment, wherein the clutch-manipulation assist device includes the clutch manipulation mechanism 151 and the actuator 173 in the same manner as the above-mentioned embodiment. Further, the clutch-manipulation assist device also includes a follower mechanism 257 such as a rack and a pinion gear which operates the clutch mechanism 61 in an interlocking manner with the clutch manipulation mechanism 151, a cable-type manipulation force transmission mechanism 272 which transmits a clutch manipulation force inputted to the clutch manipulation mechanism 151 to a follower mechanism 257, an assist follower mechanism 374 which imparts a clutch assist force to the clutch mechanism 61 in an interlocking manner with the actuator 173, and a hydraulic assist force transmission mechanism 375 which transmits a clutch assist force from the actuator 173 to the assist follower mechanism 374.

That is, the assist follower mechanism which is interlocked with the actuator may be any mechanism which can impart the clutch assist force to any one of (at least one of) the clutch manipulation mechanism, the follower mechanism and the clutch mechanism which are interlocked with the clutch manipulation mechanism.

Further, the constitution of the above-mentioned embodiment may constitute one example of the invention and it is needless to say that the invention may not be limited to a motorcycle and may be applicable to a three-wheeled vehicle or a four-wheeled vehicle (including ATV: All Terrain Vehicle) and various modifications may be made without departing from the gist of the invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A clutch-manipulation assist device for a vehicle, comprising:
    a clutch mechanism arranged in a power transmission path for transmitting a rotational driving force of an engine to a wheel and engaging/disengaging the transmission of the rotational driving force of said engine to said wheel;
    a clutch-manipulation mechanism into which a clutch manipulation force is inputted;
    an actuator generating a clutch assist force in response to an operation of said clutch manipulation mechanism;
    a support plate formed in a plate shape substantially orthogonal to a vehicle width direction;
    a follower mechanism; and
    an assist force transmission mechanism which transmits the assist force generated by said actuator to said follower mechanism, the assist force transmission mechanism including a master cylinder which generates a liquid pressure due to an operation of said actuator, a reservoir tank for said master cylinder, and a slave cylinder which operates said follower mechanism by receiving the liquid pressure from said master cylinder;

wherein said actuator is supported on a vehicle body frame by said support plate, wherein said reservoir tank is supported on an upper portion of said support plate, wherein a liquid pressure sensor is arranged in the liquid pressure path of said transmission mechanism, wherein said reservoir tank, said master cylinder, said liquid pressure sensor and said slave cylinder are arranged in order from top to bottom of a vehicle body of said vehicle, wherein said actuator is arranged in front of said engine and outside a main frame of said vehicle, wherein said actuator is arranged further outside of the vehicle body than a front fork of said vehicle, and wherein said actuator is arranged inside a front cowl of said vehicle.

2. The clutch-manipulation assist device for said vehicle according to claim 1, wherein said actuator is mounted on a head pipe of said vehicle.

3. The clutch-manipulation assist device for said vehicle according to claim 2, wherein said follower mechanism is interlocked with said actuator, and wherein said actuator is arranged on a same side as an input portion of said follower mechanism from said actuator with respect to a vehicle-body center line of said vehicle.

* * * * *